US007127671B1

(12) United States Patent
McDonald

(10) Patent No.: US 7,127,671 B1
(45) Date of Patent: Oct. 24, 2006

(54) PUBLISHING A CUSTOMIZED PUBLICATION BY DEFINING MULTIPLE SOURCES AND TIME PERIODS FOR OBTAINING ARTICLE QUOTABLE INFORMATION

(76) Inventor: David C. McDonald, 2543 Crestwood Drive, Chattanooga, TN (US) 37415

( * ) Notice: Subject to any disclaimer, the term of this patent is extended or adjusted under 35 U.S.C. 154(b) by 0 days.

(21) Appl. No.: 11/112,890

(22) Filed: Apr. 25, 2005

Related U.S. Application Data

(63) Continuation-in-part of application No. 09/952,915, filed on Sep. 14, 2001, now abandoned.

(51) Int. Cl.
*G06F 17/21* (2006.01)

(52) U.S. Cl. ............... 715/500; 715/527; 715/530; 715/531

(58) Field of Classification Search ......... 715/501.1, 715/513, 526, 500, 517, 527, 530–531; 709/200, 709/201, 217, 239; 707/1, 10
See application file for complete search history.

(56) References Cited

U.S. PATENT DOCUMENTS

| | | | |
|---|---|---|---|
| 5,692,111 A * | 11/1997 | Marbry et al. ............. | 358/1.15 |
| 5,748,805 A * | 5/1998 | Withgott et al. ............ | 382/306 |
| 5,870,770 A * | 2/1999 | Wolfe ....................... | 715/805 |
| 5,873,107 A * | 2/1999 | Borovoy et al. ......... | 715/501.1 |
| 6,029,182 A | 2/2000 | Nehab et al. | |
| 6,064,722 A | 5/2000 | Clise et al. | |
| 6,064,993 A * | 5/2000 | Ryan, Jr. ................ | 705/403 |
| 6,134,673 A | 10/2000 | Chrabaszcz | |
| 6,292,905 B1 | 9/2001 | Wallach et al. | |
| 6,304,946 B1 | 10/2001 | Mason, Jr. | |
| 6,356,922 B1 * | 3/2002 | Schilit et al. ............. | 715/512 |
| 6,442,589 B1 * | 8/2002 | Takahashi et al. .......... | 709/203 |
| 6,446,100 B1 * | 9/2002 | Warmus et al. ............ | 715/517 |
| 6,536,037 B1 | 3/2003 | Guheen et al. | |
| 6,766,362 B1 | 7/2004 | Miyasaka et al. | |
| 6,779,177 B1 | 8/2004 | Bahrs et al. | |
| 6,948,115 B1 * | 9/2005 | Aizikowitz et al. ...... | 715/500.1 |
| 2001/0056554 A1 | 12/2001 | Chrabaszcz | |
| 2002/0026499 A1 * | 2/2002 | Cantone et al. ............ | 709/219 |
| 2002/0178015 A1 * | 11/2002 | Zee .............................. | 705/1 |
| 2003/0018897 A1 * | 1/2003 | Bellis et al. ............... | 713/182 |
| 2006/0031746 A1 * | 2/2006 | Toepfer et al. ............ | 715/500 |

* cited by examiner

*Primary Examiner*—Cesar Paula
(74) *Attorney, Agent, or Firm*—Chambliss, Bahner & Stophel, P.C.

(57) ABSTRACT

A method for publishing a customized publication including an article for a customer includes obtaining information from the customer including a topic for the article and the identity of a primary source for quotable information about the topic. The method also includes establishing and following a defined schedule for a three-step process for obtaining information about the topic prior to preparing and printing the publication.

20 Claims, 4 Drawing Sheets

US 7,127,671 B1

PUBLISHING A CUSTOMIZED PUBLICATION BY DEFINING MULTIPLE SOURCES AND TIME PERIODS FOR OBTAINING ARTICLE QUOTABLE INFORMATION

CROSS REFERENCE TO RELATED APPLICATION

This application is a continuation-in-part of U.S. patent application Ser. No. 09/952,915, which was filed on Sep. 14, 2001 (now abandoned).

FIELD OF THE INVENTION

This invention relates generally to publishing methods, and more particularly to a method for publishing a customized publication for a customer.

BACKGROUND AND DESCRIPTION OF THE PRIOR ART

The creation and distribution of publications for others may take any of several forms. A common form is represented by magazines for general public circulation, in which a publication is created for sale to the general public without any direct interaction relating to the content of the publication between the publisher and any other party. Other types of publications may be created especially for a customer such as a business entity, in order for the business entity to mail, distribute or otherwise deliver (for example, by electronic means) the publication it has specially ordered or commissioned to its own customers and potential customers. Examples of such publications include, but are not limited to, magazines relating to health care that are mailed to persons living in a community served by a particular health care provider such as a hospital. Such magazines are published by publishers on behalf of the health care provider and will usually include the name of the health care provider on the cover. The magazines may also include certain news items about the health care provider, but most commonly, such magazines consist primarily of generic articles relating to various health care topics which are not specific to the health care provider or its specialties, and which are not particularly targeted to the intended readers. Such magazines, like those intended for general circulation, are usually created without any direct interaction relating to the content of the publication between the publisher and any other party. Consequently, the publisher of such a magazine can sell essentially the same magazine, excepting the cover and perhaps an article or two, to different health care providers located in different parts of the country. If the publication includes an article that is specific to or customized for the health care provider named on the cover, such article is most likely provided by the health care provider, because the publisher is typically not located in the health care provider's community and generally knows little of its specialties or of the interests of the residents of that community. Consequently, it is common for a publisher to publish one magazine for a health care provider in one community that is intended to be mailed to the residents of that community, and publish essentially the same magazine for another health care provider in another community. The disadvantage of such partially-customized or syndicated publications, from the point of view of the health care provider or other customer that commissions the publication, is that the bulk of the publication is not customized or specifically tailored to the specialties of the sponsoring entity, or to the regional interests of the residents of the community which that entity serves.

Fully-customized publications have not previously been offered because the time and work required to create a new publication that is specifically tailored to a particular customer has been thought to be greater than is practical, and because the cost of creating such a publication has been thought to be considerably more than the cost of a syndicated publication. In addition, most health care providers and other business entities that seek such publications do not have the personnel, the expertise or the desire to create their own articles for the publication. It would be desirable, therefore, if a method could be developed for creating a fully customized publication in a reasonable period of time and at reasonable cost. It would also be desirable if such method could be developed that would not require the commissioning customer to create its own customized article for the publication.

ADVANTAGES OF THE INVENTION

Among the advantages of the invention is that it permits the creation and distribution of a fully-customized publication that may emphasize the specialties of the commissioning customer without requiring significant involvement by the commissioning customer. Another advantage of the invention is that it permits the creation of such a publication that may be targeted to the interests of the intended recipients. Still another advantage of the invention is that it permits the creation of such a publication within a reasonable time and at a reasonable cost.

Additional advantages of this invention will become apparent from an examination of the drawings and the ensuing description.

Explanation of Technical Terms

As used herein, the term "article" refers to a writing about a topic.

As used herein, the term "proof" refers to a writing including one or more articles and which may include illustrations and other components. The term "proof" may also refer to a draft version of a publication.

As used herein, the term "publication" refers to a writing including one or more articles that is printed in tangible form or electronically fixed in a medium that can be communicated to intended recipients. The term "publication" may refer to a single issue, or to a series of issues of the same title. Furthermore, a "publication" may contain only a single article.

As used herein, the term "publishing" refers to the creation of a publication for distribution to others.

As used herein, the term "preparing the publication for printing" and similar phrases refers to compiling, assembling and formatting the components of a proof in a form that is suitable for printing.

As used herein, the term "printing" means printing a publication in tangible form from a proof or formatting a proof for distribution by electronic means.

As used herein, the term "quotable information" means information that may be attributed to a specific source.

SUMMARY OF THE INVENTION

The invention is a method for publishing a customized publication which includes an article for a customer. According to this method, information is obtained from the customer relating to the publication. Such information includes a topic for the article and the identity of a Primary Source for quotable information about the topic. A First Period of time is defined within which to obtain quotable information about the topic from the Primary Source. A Second Period of time is defined within which to obtain quotable information about the topic from a Secondary Source. A Third Period of time is also defined within which to obtain information about the topic from a Tertiary Source. A beginning time is set for the First Period, whereby an ending time for the first period is set. An attempt is made to obtain quotable information about the topic from the Primary Source during the First Period. If quotable information about the topic is obtained from the Primary Source during the First Period, a proof may be prepared for publication and printed. If the attempt to obtain quotable information about the topic from the Primary Source during the First Period is unsuccessful, however, the publisher will seek to identify a Secondary Source. A beginning time for the Second Period is set, thereby setting an ending time for the Second Period. A Secondary Source for quotable information about the topic is identified, and an attempt is made to obtain quotable information about the topic from the Secondary Source during the Second Period. If quotable information about the topic is obtained from the Secondary Source during the Second Period, a proof may be prepared for printing and printed. If the attempt to obtain quotable information about the topic from the Secondary Source during the Second Period is unsuccessful, however, the publisher will seek to identify a Tertiary Source. A beginning time for the Third Period is set, thereby setting an ending time for the Third Period. A Tertiary Source for information about the topic is identified, and an attempt is made to obtain information about the topic from the Tertiary Source during the Third Period. A proof may then be prepared for printing and printed.

In order to facilitate an understanding of the invention, the preferred embodiments of the invention are illustrated in the drawings, and a detailed description thereof follows. It is not intended, however, that the invention be limited to the particular embodiments described or to use in connection with the type of publications described herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
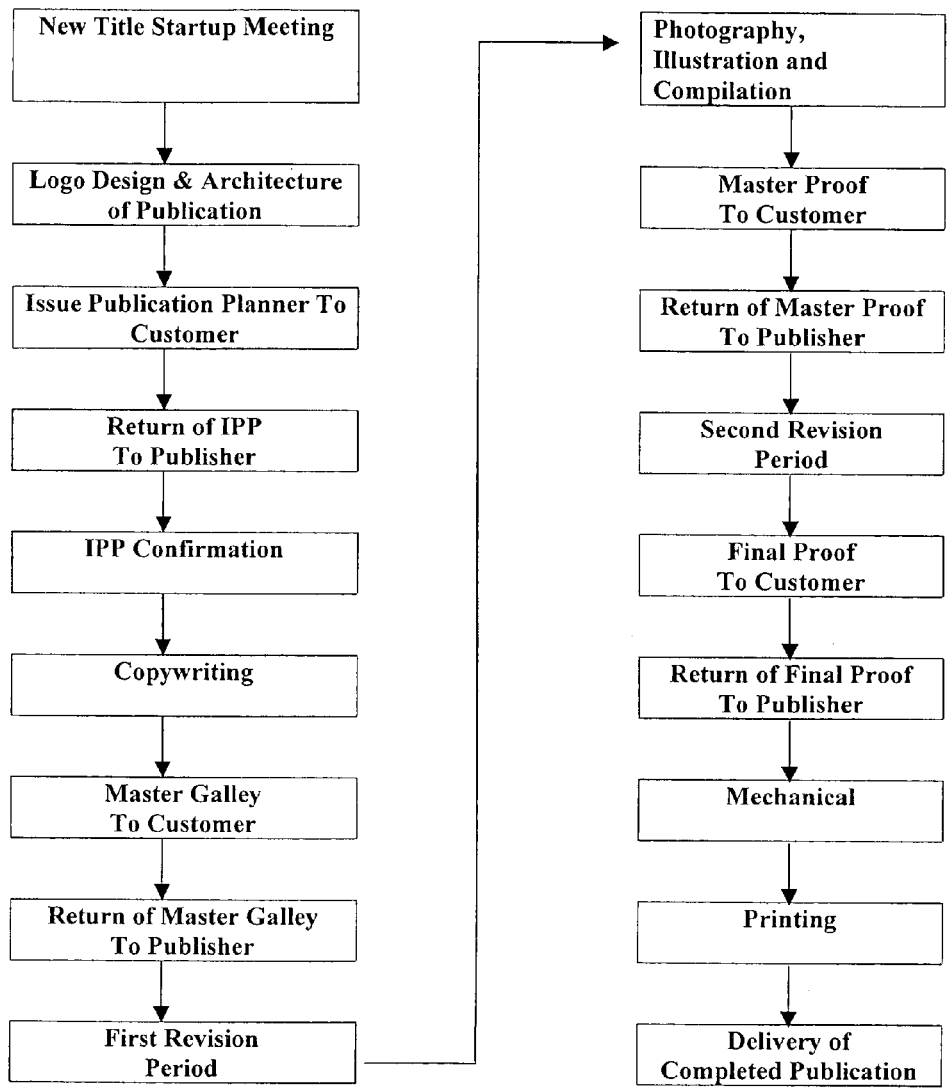
FIG. 1 is a flow chart illustrating the steps of a preferred embodiment of the invention.

A preferred embodiment of the invention is illustrated in the drawings. As shown in FIG. 1, the first step in the practice of the preferred method is the New Title Startup Meeting. When a customer agrees to have the publisher publish its custom publication, the publisher will preferably hold an initial meeting at the customer's facility in order to explain the publishing method and to begin obtaining relevant information about the proposed publication from the customer. The objectives of this meeting are to define the duties and responsibilities of the parties and to agree on a schedule for the various events in the publishing process. In addition, the publisher will seek to obtain information about the publication desired from the customer. Such information may be communicated at the New Title Startup Meeting, or by the customer's completing a form provided by the publisher at the meeting and returning it subsequently to the publisher. In a preferred embodiment of the invention, a form to solicit information about the publication desired is provided by the publisher to the customer electronically, completed by the customer by use of a computer and thereafter transmitted to the publisher electronically. Preferably, the publisher will seek information about the type of publication desired, a title for the publication, the number of articles (which may be one or more) for the publication, a topic for each article, the number of pages for the publication, the frequency of distribution of the publication (such as, for example, once only, monthly or quarterly) and the target audience. The publisher will likely seek additional information about the business of the customer, including its specialties and the features or attributes that distinguish it from its competitors. If the customer so requires, the publisher may provide the customer with a list of suggested article topics for an issue of the publication and a list of suggested publication titles. The publisher will also seek to obtain the identity of a Primary Source for quotable information about each topic for an article. If the publication is to be related to health care, for example, such sources may include a local doctor with specific expertise in a particular area, or a local personality who has undergone a particular procedure. The Primary Source may also be a well-known organization such as the American Cancer Society or a publication of another party, such as the *New England Journal of Medicine*.

The publisher and the customer will also establish a number of periods of time within which certain actions are to be performed in order that the publication may be published in a timely manner. Some of the actions to be performed will require the entire period established for such action; some may be performed in less time than the period that is set.

If the customer is to complete a form such as an Issue Publication Planner (IPP) to provide the publisher with additional information about the desired publication, the parties will define a period of time, measured from the New Title Startup Meeting (or from a later time, if the Planner is delivered to the customer after the Meeting), within which the Planner will be completed and returned to the publisher. This same period of time may also be utilized by the publisher to design and create a logo or other distinctive title for the publication, and to establish the basic architecture or layout of the publication.

The parties will also define a First Period of time within which to obtain quotable information from the Primary Source and a Second Period of time within which to obtain quotable information from a Secondary Source, in case such information is not or cannot be obtained from the Primary Source during the First Period. In addition, they will define a Third Period of time within which to obtain information (which preferably will be quotable) from a Tertiary Source, in case quotable information is not or cannot be obtained from the Secondary Source during the Second Period. The parties will also preferably define a Preparation Period of time within which to prepare a proof for printing and a Printing Period of time for printing the publication. The parties may also define other periods of time within which other tasks of the preparation process are to be performed. Such other periods of time may include a Reference Period for obtaining background or supplemental information for use in writing an article, an Illustration Period of time for preparing illustrations and/or photographs for the publication, one or more Proof Preparation Periods of time for preparing one or more proofs or drafts of the publication and one or more Review Periods of time for review of a proof by the customer. The parties may also define one or more Revision Periods of time for revision of the proof to address the comments and changes of the customer which result from its review, and a Mechanical Period of time to complete the mechanical steps and other steps in preparing the proof for printing.

It is contemplated that the publication may include a number of articles. In such event, there will be certain periods of time established for actions relating to each article to be included in the publication. Periods for the performance of particular actions relating to different articles for a publication, such as the First Period for obtaining information from the Primary Source, for example, will preferably be established so as to occur simultaneously for each article. If the publication is to include more than a single article, the parties may also define a Compilation Period of time for compilation of a plurality of draft articles into a proof of the publication. If the publication is to include one or more items that have been previously prepared, the parties may define a Selection Period of time for selecting one or more of such items for use in the publication.

Although all of these periods of time may be defined near the beginning of the process, they will take effect at differing times. The process also contemplates that a beginning time for each time period will be set, thereby establishing an ending time. Some, and perhaps many, of the time periods will overlap other time periods. In a preferred embodiment of the invention, the publisher, in consultation with the customer, employs a computer and suitable software to define the various times during which certain tasks in the process must be completed and to set beginning and ending times (or dates) for each such task.

An example of the time periods for a particular publication process, as well as exemplary dates for the various events of the preferred process, is set out in the following Table.

TABLE

| TASK | DEFINED PERIOD | BEGINNING TIME | ENDING TIME |
| --- | --- | --- | --- |
| New Title Startup Meeting | | | January 1 |
| Logo Design And General Architecture Of Publication | 10 days | January 1 | January 10 |
| Issue Publication Planner (IPP) To Customer | | | January 3 |
| Return Of IPP To Publisher | 7 days | January 3 | January 10 |
| IPP Confirmation | 1 day | On Return Of IPP To Publisher (latest date for such Return, January 10, assumed) | January 11 |
| Copywriting (includes First Period, Second Period, Third Period, Reference Period and Period For Completion of Master Galley) | 26 days | On Confirmation Of IPP (January 11 assumed) | February 6 |
| | First Period - 7 days | On Confirmation Of IPP (January 11 assumed) | January 18 |
| | Second Period - 5 days | At End Of First Period (January 18 assumed) | January 23 |
| | Third Period - 5 days | At End Of Second Period (January 23 assumed) | January 28 |
| Preparation Period (includes all remaining periods except Printing) | 48 days | At End Of FFF Process (January 28 assumed) | March 17 |
| Reference Period | 3 days | At End Of FFF Process (January 28 assumed) | January 31 |
| Completion Of Master Galley (first draft or proof) | 6 days | At End Of Reference Period (January 31 assumed) | February 6 |
| Master Galley (Proof) To Customer | | At End Of Period For Completion of Master Galley (February 6 assumed) | February 6 |
| Return Of Master Galley (Proof) To | 7 days | On Submission Of Master Galley To | February 13 |

TABLE-continued

| TASK | DEFINED PERIOD | BEGINNING TIME | ENDING TIME |
|---|---|---|---|
| Publisher | | Customer (February 6 assumed) | |
| First Revision Period | 7 days | On Return of Master Galley (February 13 assumed) | February 20 |
| Period For Photography And Other Illustrations | 7 days | On Return Of Master Galley (February 13 assumed) | February 20 |
| Compilation Period | 7 days | On Return Of Master Galleys (February 13 assumed) | February 20 |
| Master Proof To Customer | | On Completion Of First Revisions, Photography And Other Illustrations And Compilation (February 20 assumed) | February 20 |
| Return Of Master Proof To Publisher | 7 days | On Delivery Of Master Proof To Customer (February 20 assumed) | February 27 |
| Second Revision Period | 10 days | On Return Of Master Proof To Publisher (February 27 assumed) | March 9 |
| Final Proof To Customer | | On Completion Of Second Revision Period (March 9 assumed) | March 9 |
| Return Of Final Proof To Publisher | 5 days | On Delivery of Final Proof To Customer (March 9 assumed) | March 14 |
| Final Revision Period | 3 days | On Return of Final Proof To Publisher (March 14 assumed) | |
| Mechanical (Preparation For Printing) | 3 days | On Return of Final Proof To Publisher (March 14 assumed) | March 17 |
| Printing | 15 days | On Completion of Mechanical Preparation (March 17 assumed) | April 1 |

Figure 2:
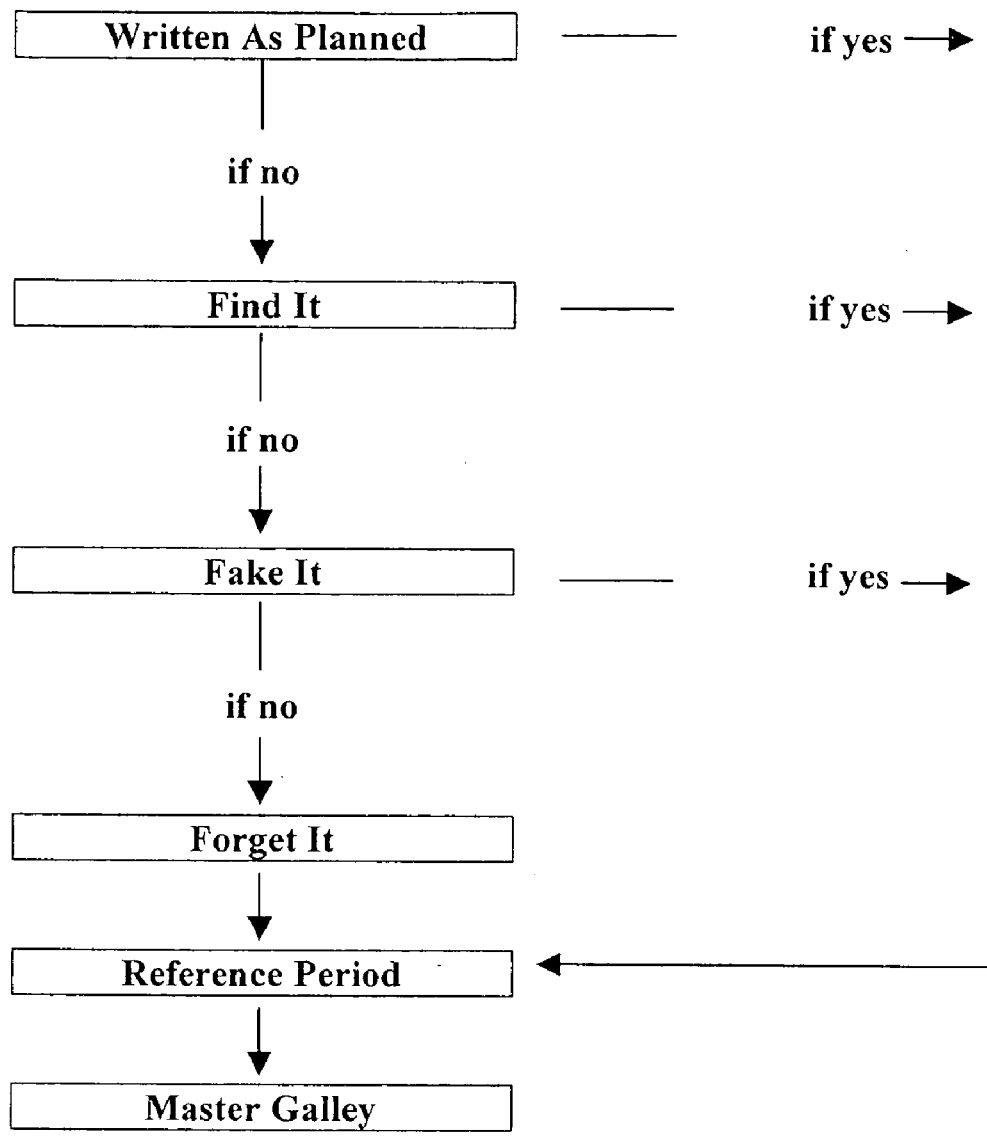
FIG. 2 is a flow chart illustrating the steps of the Copywriting Process of the preferred embodiment of the invention illustrated in FIG. 1.

If the Issue Publication Planner or another form is used to obtain information from the customer, it is preferred that a copy of the production schedule be given to the customer along with the form. When the Issue Publication Planner is completed and returned to the publisher, the publisher will preferably call the customer to review, discuss and confirm the information contained in the Planner. In the alternative, the publisher may communicate with the customer by e-mail. The publisher may take this opportunity to obtain any other useful information that has not previously been obtained regarding the publication or the customer's business. Once the information contained in the Planner has been confirmed, the Copywriting Process may begin. The Copywriting Process includes the FFF Process, or the Find It, Fake It, Forget It™ Process, which is illustrated in FIG. 2. During the First Period that has been established, the publisher will attempt, for each article in the publication, to obtain quotable information about the topic from the Primary Source that has been identified by the customer. This may involve arranging and conducting an interview of the Primary Source or, if the Primary Source is not an individual, someone associated with the Primary Source. If the publisher is successful in obtaining quotable information from the Primary Source during the First Period, the publisher will proceed to write the article as planned, using the quotable information obtained from the Primary Source and preferably utilizing a computer. However, the publisher may not be able to make contact with the Primary Source or may not be able to arrange an interview during the First Period. If the publisher is unable to obtain quotable information from the Primary Source during the First Period, the publisher will attempt to "Find It" during the Second Period. In other words, the publisher will identify a Secondary Source for quotable information about the topic (perhaps with the help of the customer) and attempt to obtain quotable information from such source. As with the Primary Source, this may involve arranging and conducting an interview of the Secondary Source. If the publisher is successful in obtaining quotable information about the topic from the Secondary Source during the Second Period, the publisher will begin the process of writing the article using the information obtained from the Secondary Source, preferably utilizing a computer. However, if the publisher is unable to obtain quotable information from the Secondary Source during the Second Period, the publisher will attempt to "Fake It" during the Third Period. In other words, the publisher will identify a Tertiary Source for information about the topic, such as a well-respected publication, and will attempt to obtain information about the topic, preferably quotable information, from the Tertiary Source. If the publisher is unable to obtain information about the topic from a Tertiary Source during the Third Period, the publisher will "Forget It" and proceed to begin writing the article, preferably utilizing a computer, without relying on a Primary, Secondary or Tertiary Source, or if this cannot be done, the publisher may delete this article from this issue of the publication. Once the FFF Process is completed, the Preparation Period which the parties have preferably defined begins. The Preparation Period includes all of the remaining steps and associated periods in the publication process, except for printing.

The parties may also have provided for a reference period, as a part of the Preparation Period, during which the publisher may obtain background or other information about the topic for use in preparing each article. After the reference material is obtained, if desired, a draft of the article is written, preferably utilizing a computer. Once the draft article is written, it is preferably put in a form which simplifies revision. Such form may include, for example, double spacing between lines, extra space between paragraphs and wide margins. The draft article may also be put in an electronically accessible form. The draft article in this form, which may be referred to as a Master Galley, may then be sent to the customer for review. If the draft is electronically accessible, it may be sent to the customer by e-mail. If there are a plurality of articles being prepared for a publication, it is preferred that the Master Galleys for each one be sent to the customer at the same time. Preferably, the customer will review the Master Galley or Galleys, make any desired changes to the article or articles, and send the revised or "marked-up" Master Galleys to the publisher, either by physically marking a paper copy or by making changes by use of a computer and transmitting the revised version to the publisher. The publisher may then correct or modify the articles to reflect the customer's comments and corrections to the Master Galleys during a First Revision Period.

If desired, the publisher may then undertake to create photographs and other illustrations to supplement each article during an Illustration Period. This period may coincide, at least in part, with the First Revision Period. Once the revisions and illustrations have been completed, a Master Proof of the publication is assembled, preferably with the aid of a computer. If the publication is to include a plurality of articles, a Compilation Period may be established (which may coincide with or overlap the First Revision Period and the Illustration Period) to compile the articles into a Master Proof. If the publication is to include previously prepared materials, a Selection Period (not shown) may be established (which will preferably coincide with or overlay the First Revision Period and the Illustration Period) to select such pre-existing materials for inclusion in the publication. Preferably, the Master Proof is the first complete form of what will become the publication, including one or more articles, photographs and other illustrations. The Master Proof is sent to the customer for review. A period of time is allocated for review and revision of the Master Proof by the customer. By the end of this period, the customer should return the "marked-up" Master Proof to the publisher. Preferably, a Second Revision Period will be defined during which the publisher may undertake to revise the Master Proof according to the comments and suggestions of the customer. There may also be further internal reviews and changes of the corrected draft by various members of the publisher's staff, or there may be additional reviews of various drafts by the customer. It is preferred that after the publisher has made the changes and corrections required by the customer, the customer will be provided with a Final Proof for further review. If the process includes the opportunity for the customer to review a Final Proof, the customer will make any further corrections and revisions during a period defined for such purpose, and the customer will return the "marked-up" Final Proof to the publisher. After return of the Final Proof to the publisher, the publisher will preferably utilize a Final Revision Period for further revisions of the Proof and a Mechanical Period (which may coincide with or overlap the Final Revision Period) for completion of the mechanical (including formatting) steps in preparing the Proof for printing.

Finally, the publisher will arrange for printing of the Proof during a Printing Period and will deliver the completed publication to the customer. It is also contemplated that the publisher may distribute or arrange for distribution of the publication directly to the intended recipients.

Figure 3:
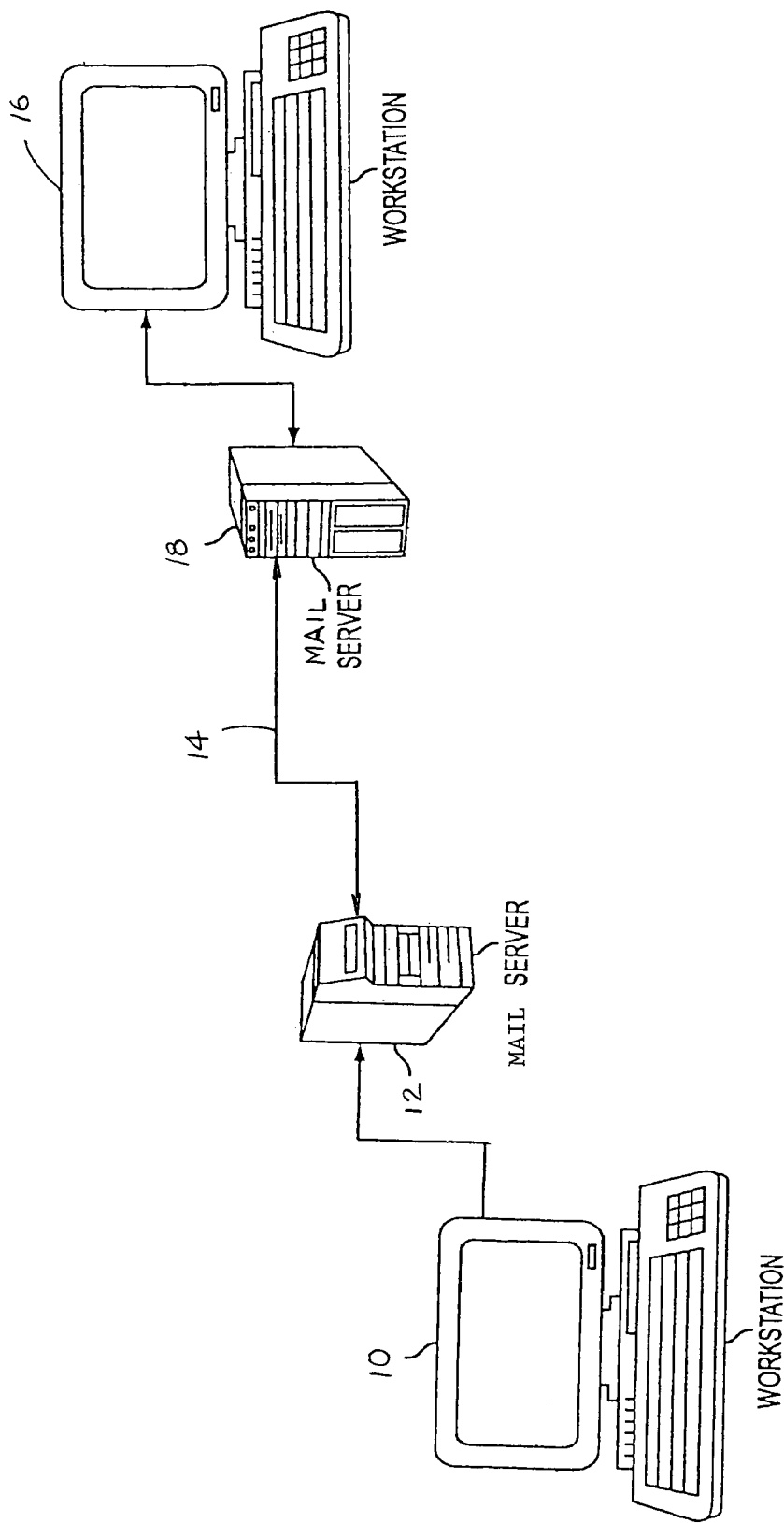
FIG. 3 is a schematic representation of the communication process between publisher and customer that is a part of a preferred embodiment of the invention.

FIG. 3 illustrates the communication that may occur between the publisher and the customer during the practice of the preferred method. As shown in FIG. 3, publisher's computer workstation 10 is preferably provided with software which establishes the various time periods for performance of the various tasks of the method and for calculating the times (dates) on which such tasks should begin and end, as well as with processing software for drafting, editing and formatting articles, photographs and graphics, and the resulting proofs. Workstation 10 also includes electronic storage means for storing articles and/or proofs. In addition, workstation 10 includes communications software and hardware for communication with other computers via the internet. Thus, as shown in FIG. 3, publisher's workstation 10 may communicate by e-mail through publisher's mail server 12 and internet connection 14 with customer's computer workstation 16, which is in communication with customer's mail server 18. Customer's computer workstation includes communications software and hardware to enable e-mail communication via the internet. The means of communication illustrated in FIG. 3 may be employed to transmit draft articles and proofs and to receive comments thereon. In addition, such means of communication may be employed to transmit information about the various time periods that have been established for performing the various tasks of the method, as well as updates and changes to the schedule.

Figure 4:
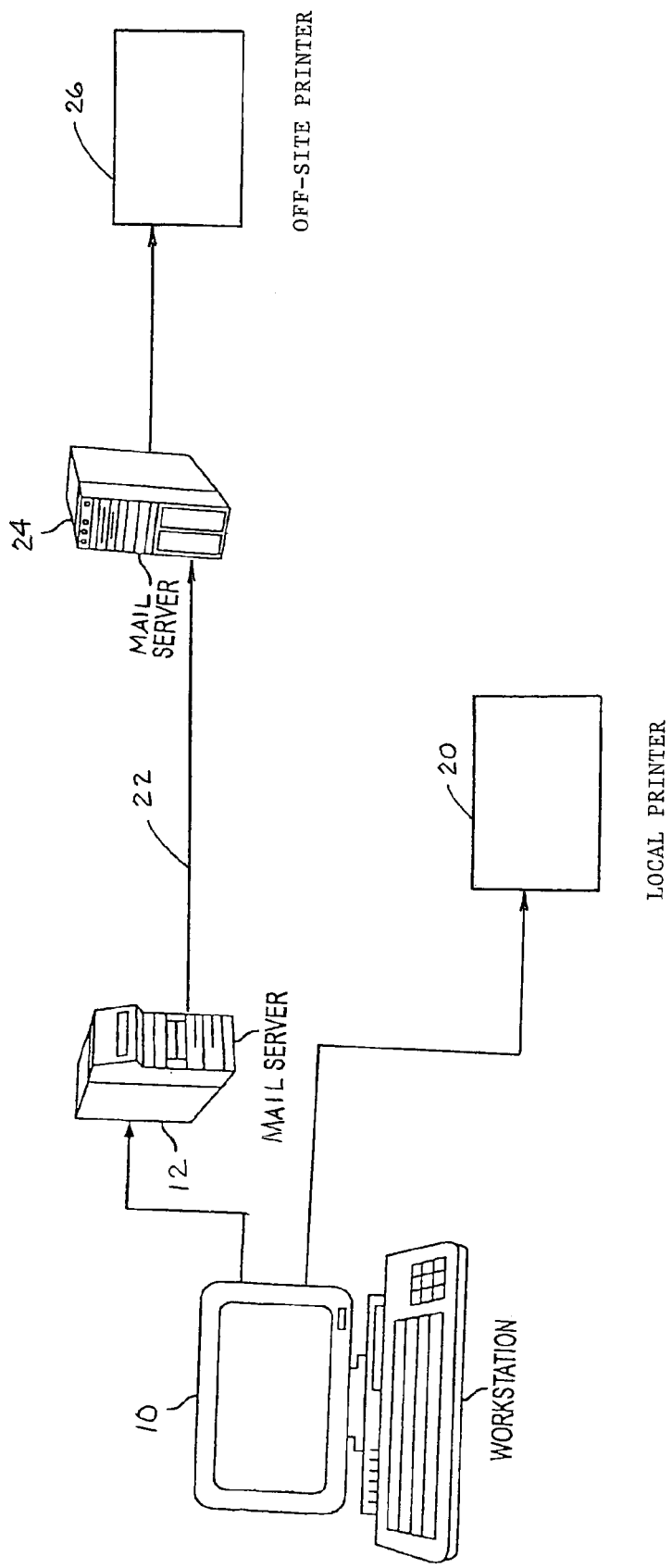
FIG. 4 is a schematic representation of the process by which a publisher transmits a proof to a printer for printing in a preferred embodiment of the invention.

FIG. 4 illustrates how publisher's computer workstation 10 may be employed to transmit a proof to a printer according to a preferred embodiment of the invention. As shown therein, workstation 10 may be employed to electronically transmit a proof for printing to local printer 20, or it may employ an internet connection 22 between publisher's mail server 12 and external printer's mail server 24 to transmit the proof electronically to off-site printer 26. The process by which this is accomplished is known to those having ordinary skill in the art to which the invention relates as "Computer To Plate" or "CTP" transmission.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for publishing a customized publication including an article for a customer, which method comprises the steps of:
   (a) obtaining information from such customer relating to the publication, said information comprising:
      (i) a topic for the article; and
      (ii) the identity of a primary source for quotable information about the topic;
   (b) defining a first period of time within which to obtain quotable information about the topic from the primary source;
   (c) defining a second period of time within which to obtain quotable information about the topic from a secondary source;

(d) defining a third period of time within which to obtain information about the topic from a tertiary source;
(e) setting a beginning time for the first period, whereby an ending time for the first period is set;
(f) attempting to obtain quotable information about the topic from the primary source during the first period;
(g) if successful in obtaining quotable information about the topic from the primary source during the first period, then proceeding directly to step (m);
(h) if unsuccessful in obtaining quotable information about the topic from the primary source during the first period, setting a beginning time for the second period, whereby an ending time for the second period is set;
(i) identifying a secondary source for quotable information about the topic and attempting to obtain quotable information about the topic from the secondary source during the second period;
(j) if successful in obtaining quotable information about the topic from the secondary source during the second period, then proceeding directly to step (m);
(k) if unsuccessful in obtaining quotable information about the topic from the secondary source during the second period, setting a beginning time for the third period, whereby an ending time for the third period is set;
(l) identifying a tertiary source for information about the topic and attempting to obtain information about the topic from the tertiary source during the third period;
(m) preparing a proof for printing;
(n) printing the publication.

2. The method of claim 1 which includes the following steps instead of steps (m) and (n):
(m) utilizing a computer to prepare a proof for printing;
(n) printing the publication.

3. The method of claim 1 which includes providing the customer, prior to step (a), with a listing of suggested topics.

4. The method of claim 1 in which step (a) includes obtaining a desired length of the article from the customer.

5. The method of claim 1 which includes the following steps instead of steps (b), (c), (d) and (e) of claim 1:
(b) utilizing a computer to define a first period of time within which to obtain quotable information about the topic from the primary source;
(c) utilizing a computer to define a second period of time within which to obtain quotable information about the topic from a secondary source;
(d) utilizing a computer to define a third period of time within which to obtain information about the topic from a tertiary source;
(e) utilizing a computer to set a beginning time for the first period, whereby an ending time for the first period is set.

6. The method of claim 1 which includes the following steps instead of steps (m) and (n):
(m) defining a preparation period of time within which to prepare the proof for printing;
(n) setting a beginning time for the preparation period, whereby an ending time for the preparation period is set;
(o) preparing the proof for printing prior to the expiration of the preparation period;
(p) defining a printing period of time for printing the publication;
(q) setting a beginning time for the printing period, whereby an ending time for the printing period is set;
(r) printing the publication during the printing period.

7. The method of claim 6 which includes the following steps instead of steps (m) through (r):
(m) defining a preparation period of time within which to prepare the proof for printing;
(n) setting a beginning time for the preparation period, whereby an ending time for the preparation period is set;
(o) defining an illustration period of time for preparing illustrations for the publication;
(p) setting a beginning time for the illustration period, whereby an ending time for the illustration period is set;
(q) preparing illustrations for the publication during the illustration period;
(r) preparing the proof for printing prior to the expiration of the preparation period;
(s) defining a printing period of time for printing the publication;
(t) setting a beginning time for the printing period, whereby an ending time for the printing period is set;
(u) printing the publication during the printing period.

8. The method of claim 6 which includes the following steps instead of steps (m) through (r):
(m) defining a preparation period of time within which to prepare a proof;
(n) setting a beginning time for the preparation period, whereby an ending time for the preparation period is set;
(o) defining an illustration period of time for preparing illustrations for the publication;
(p) setting a beginning time for the illustration period, whereby an ending time for the illustration period is set;
(q) preparing illustrations for the publication during the illustration period;
(r) preparing a proof;
(s) defining a review period of time for review of the proof by the customer;
(t) setting a beginning time for the review period, whereby an ending time for the review period is set;
(u) submitting the proof to the customer for review during the review period;
(v) defining a printing period of time for printing the publication;
(w) setting a beginning time for the printing period, whereby an ending time for the printing period is set;
(x) printing the publication during the printing period.

9. The method of claim 8 which includes the following steps instead of step (u):
(u1) electronically submitting the proof for the customer to review and provide comments thereon during the review period;
(u2) defining a revision period of time for revision of the proof;
(u3) setting a beginning time for the revision period, whereby an ending time for the revision period is set;
(u4) revising the proof to address the customer's comments during the revision period.

10. A method for publishing a customized publication including a plurality of articles for a customer, which method comprises the steps of:
(a) obtaining information from such customer relating to the publication, said information comprising:
(i) a topic for each of a plurality of articles; and
(ii) the identity of a primary source for quotable information about each topic;

(b) defining, for each article:
  (1) a first period of time within which to obtain quotable information about the topic from the primary source;
  (2) a second period of time within which to obtain quotable information about the topic from a secondary source;
  (3) a third period of time within which to obtain information about the topic from a tertiary source;
(c) setting, for each article, a beginning time for the first period, whereby an ending time for the first period is set;
(d) attempting, for each article, to obtain quotable information about the topic from the primary source during the first period;
(e) proceeding directly to step (k) for each article for which quotable information about the topic was obtained from the primary source during the first period;
(f) setting, for each article for which quotable information about the topic was not obtained from the primary source during the first period, a beginning time for the second period, whereby an ending time for the second period is set;
(g) identifying, for each article for which quotable information about the topic was not obtained from the primary source during the first period, a secondary source for quotable information about the topic and attempting to obtain quotable information about the topic from the secondary source during the second period;
(h) proceeding directly to step (k) for each article for which quotable information about the topic was obtained from the secondary source during the second period;
(i) setting, for each article for which quotable information about the topic was not obtained from the secondary source during the second period, a beginning time for the third period, whereby an ending time for the third period is set;
(j) identifying, for each article for which quotable information about the topic was not obtained from the secondary source during the second period, a tertiary source for information about the topic and attempting to obtain information about the topic from the tertiary source during the third period;
(k) utilizing a computer to prepare a draft of each article;
(l) utilizing a computer to compile the draft articles into a proof of the publication;
(m) printing the publication.

11. The method of claim 10 which includes the following steps instead of step (m):
  (m) electronically transmitting the proof to a printer;
  (n) printing the publication.

12. The method of claim 10 which includes providing the customer, prior to step (a), with a listing of suggested topics.

13. The method of claim 10 in which step (a) includes obtaining a desired length of the article from the customer.

14. The method of claim 10 in which step (a) includes obtaining a title for the publication from the customer.

15. The method of claim 10 which includes the following steps instead of steps (b) and (c) of claim 10:
  (b) utilizing a computer to define, for each article:
    (1) a first period of time within which to obtain quotable information about the topic from the primary source;
    (2) a second period of time within which to obtain quotable information about the topic from a secondary source;
    (3) a third period of time within which to obtain information about the topic from a tertiary source;
  (c) utilizing a computer to set, for each article, a beginning time for the first period, whereby an ending time for the first period is set;
  and which includes the following step instead of step (f) of claim 10:
  (f) utilizing a computer to set, for each article for which quotable information about the topic was not obtained from the primary source during the first period, a beginning time for the second period, whereby an ending time for the second period is set;
  and which includes the following step instead of step (i) of claim 10:
  (i) utilizing a computer to set, for each article for which quotable information about the topic was not obtained from the secondary source during the second period, a beginning time for the third period, whereby an ending time for the third period is set.

16. The method of claim 10 which includes the following steps instead of step (b):
  (b) defining, for each article:
    (1) a first period of time within which to obtain quotable information about the topic from the primary source;
    (2) a second period of time within which to obtain quotable information about the topic from a secondary source;
    (3) a third period of time within which to obtain information about the topic from a tertiary source;
    (4) a proof preparation period of time within which to prepare a draft of the article;
  and which includes the following step instead of step (k):
  (k) preparing a draft of each article during the proof preparation period;
  and which includes the following steps instead of steps (l) and (m):
  (l) defining a compilation period of time for compilation of the draft articles into a proof of the publication;
  (m) defining a review period of time for review of the proof by the customer;
  (n) defining a printing period of time for printing of the publication from the proof;
  (o) setting, for each article, a beginning time for the proof preparation period, whereby an ending time for the proof preparation period is set;
  (p) setting a beginning time for the compilation period, whereby an ending time for the compilation period is set;
  (q) setting a beginning time for the review period, whereby an ending time for the review period is set;
  (r) setting a beginning time for the printing period, whereby an ending time for the printing period is set;
  (s) compiling the draft articles into a proof of the publication during the compilation period;
  (t) submitting the proof of the publication to the customer for review during the review period;
  (u) printing the publication during the printing period.

17. The method of claim 16 which includes the following steps instead of step (k):
  (k1) defining an illustration period of time for preparing illustrations for each article;

(k2) setting a beginning time for the illustration period, whereby an ending time for the illustration period is set;

(k3) preparing illustrations for each article during the illustration period;

(k4) preparing, for each article, a draft during the proof preparation period.

18. The method of claim 16 which includes the following steps instead of step (s):

(s1) defining a selection period of time for selection of one or more items that have been previously prepared for use in the publication;

(s2) setting a beginning time for the selection period, whereby an ending time for the selection period is set;

(s3) selecting one or more items that have been previously prepared for use in the publication during the selection period;

(s4) compiling the draft articles and the previously-prepared items into a proof of the publication during the compilation period.

19. The method of claim 16 which includes the following steps instead of step (t):

(t1) submitting the proof of the publication for the customer to review and provide comments thereon during the review period;

(t2) defining a revision period of time for revision of the proof of the publication;

(t3) setting a beginning time for the revision period, whereby an ending time for the revision period is set;

(t4) revising the proof of the publication to address the customer's comments during the revision period.

20. The method of claim 19 which includes the following step instead of step (t1):

(t1) electronically transmitting the proof of the publication for the customer to review and provide comments thereon during the review period.

* * * * *